No. 687,599. Patented Nov. 26, 1901.
E. BRILLIÉ.
APPARATUS FOR CONTROL OF AUTOMOBILES.
(Application filed Mar. 31, 1899.)
(No Model.) 2 Sheets—Sheet 1.
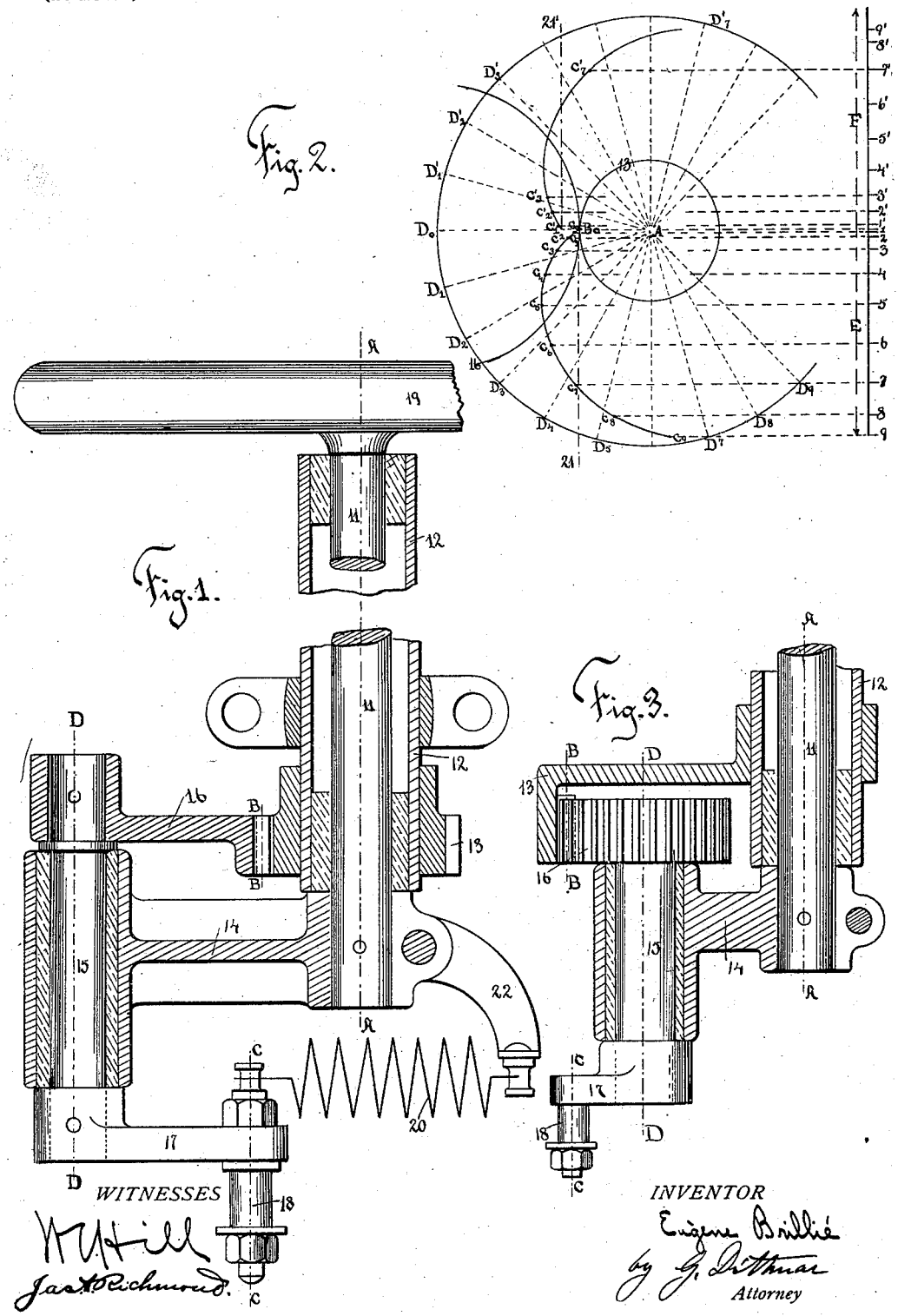

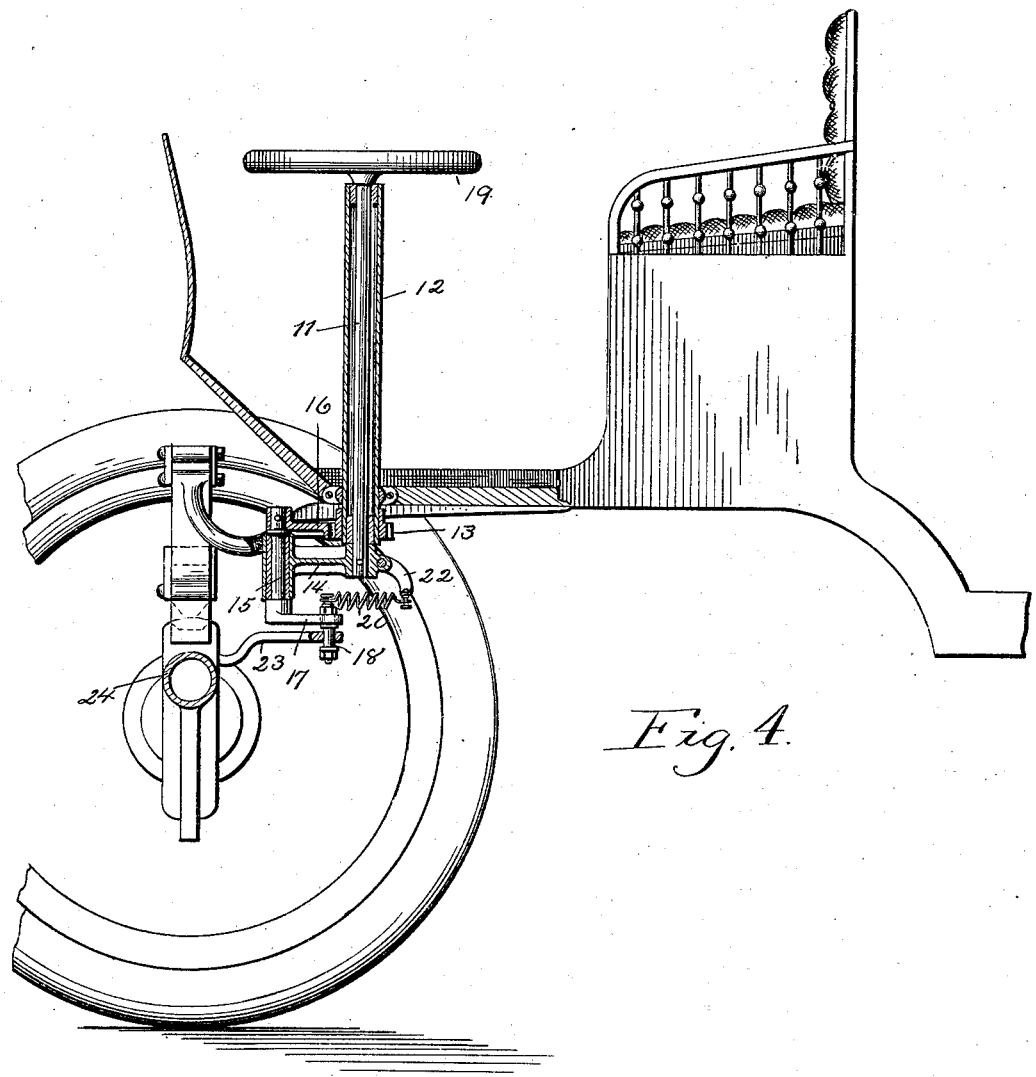

ns, nothing.# UNITED STATES PATENT OFFICE.

EUGENE BRILLIÉ, OF PARIS, FRANCE.

APPARATUS FOR CONTROL OF AUTOMOBILES.

SPECIFICATION forming part of Letters Patent No. 687,599, dated November 26, 1901.

Application filed March 31, 1899. Serial No. 711,294. (No model.)

*To all whom it may concern:*

Be it known that I, EUGENE BRILLIÉ, a citizen of the French Republic, residing at Paris, France, have invented certain new and useful Improvements in Apparatus for the Direction and Control of Automobiles; and I do hereby declare the following to be a full, clear, and exact description of the invention, such as will enable others skilled in the art to which it appertains to make and use the same.

This invention relates to a novel means or apparatus for controlling the steering mechanism of automobile vehicles; and its object is to provide a steering means which will be voluntarily irreversible—in other words, which will maintain the position it is made to assume until the same is modified by the hand of the operator.

It consists in the novel construction, arrangement, and combination of the parts of a controlling steering mechanism, as hereinafter specified, and defined in the claim hereto appended.

For a better understanding reference will be had to the accompanying drawings, wherein—

Figure 1 is a vertical section of one type of my controller employing an epicycloidal movement. Fig. 2 is a diagrammatical plan illustrating the various working phases. Fig. 3 is a vertical section of a slightly-modified form having a hypocycloidal movement. Fig. 4 is a sectional elevation of an automobile carriage, showing the general management of my improved controller in its application to the steering mechanism of the vehicle.

A A or 11 designates the axis of control. At the upper portion of the arbor or spindle 11 is rigidly secured a hand-wheel 19, by which said spindle may be rotated within the stationary hanger or sleeve 12. A lever 14 is splined in the lower part of the spindle 11, the free end of which lever passes around a spindle D D or 15, which is parallel with the spindle 11. To the upper part of this spindle 15 is secured a toothed sector 16, which meshes at B with a pinion 13, carried on the sleeve 12. At the lower extremity of said spindle is situated an arm 17, which supports the controlling-rod mounted on the axle C C or 18. The direction of this rod, which is not shown in Fig. 1, is normal to the plan of that figure. The parts will readily be recognized and understood by reference to Fig. 4. Here the controller is shown applied to the steering-gear of an automobile carriage. This is the well-known form and requires no description here. The connecting-rod 23 is connected to and coöperates with the axle 24 in the usual manner and serves to receive the crank-pin 18.

Having described the nature and object of my invention, I will now describe its operation.

If a rotary impulse be given to the hand-wheel 19, the shaft 15 will describe a circle around the spindle 11. The sector 16, meshing with the fixed pinion 13 and all parts connected with sector 16, and particularly the crank-pin 18, connected with arm 17, will describe an epicycloid. Referring to Fig. 2, we will assume that the axis C C of spindle 18 passes through the primitive circle B B between sector 16 and pinion 13 and that it occupies the position B, which is the normal position in which the motor-carriage or other vehicle is guided in a straightforward direction. It will thus be seen that it will be impossible for the steering mechanism to voluntarily assume its own position or direction and that the hand-wheel 19 will consequently remain in the position it is placed by the operator without the necessity of holding it.

If the hand-wheel 19 and therefore the shaft 15 are given equidistant displacements $D^0 D'$ $D^2$, the corresponding positions of the crank-pin 18 will be $B^0 C' C^2$, and the displacements of the rod 21, in avoiding the obliquities which it might take, are shown upon a scale E, Fig. 2, by the ordinates 0 1 2 3.

I claim as my invention—

In means for controlling the steering mechanism of automobiles, the combination of a stationary vertical sleeve, a controller-rod journaled in said sleeve, means for rotating said spindle-rod, a pinion fixed on the sleeve, an arm projecting from the spindle, a sleeve carried at the end of the arm, a vertical shaft journaled in the last-named sleeve, a toothed sector secured to one end of the shaft and engaging the pinion, a crank-arm projecting from the other end of the shaft, a crank-pin journaled in the crank-arm, and means connecting the crank-pin with the vehicle-shaft, substantially as described.

In testimony whereof I affix my signature in presence of two witnesses.

EUGENE BRILLIÉ.

Witnesses:
JOSEPH BURTY,
EDWARD P. MACLEAN.